April 10, 1934.  F. GELSTHARP  1,954,077

PLATE GLASS

Filed July 8, 1932

INVENTOR
Frederick Gelstharp
by
Bradley & Bell
Attys

Patented Apr. 10, 1934

1,954,077

UNITED STATES PATENT OFFICE 1,954,077

PLATE GLASS

Frederick Gelstharp, Tarentum, Pa., assignor to Pittsburgh Plate Glass Company, a corporation of Pennsylvania Application July 8, 1932, Serial No. 621,379

2 Claims. (Cl. 49—33)

Figure 1:
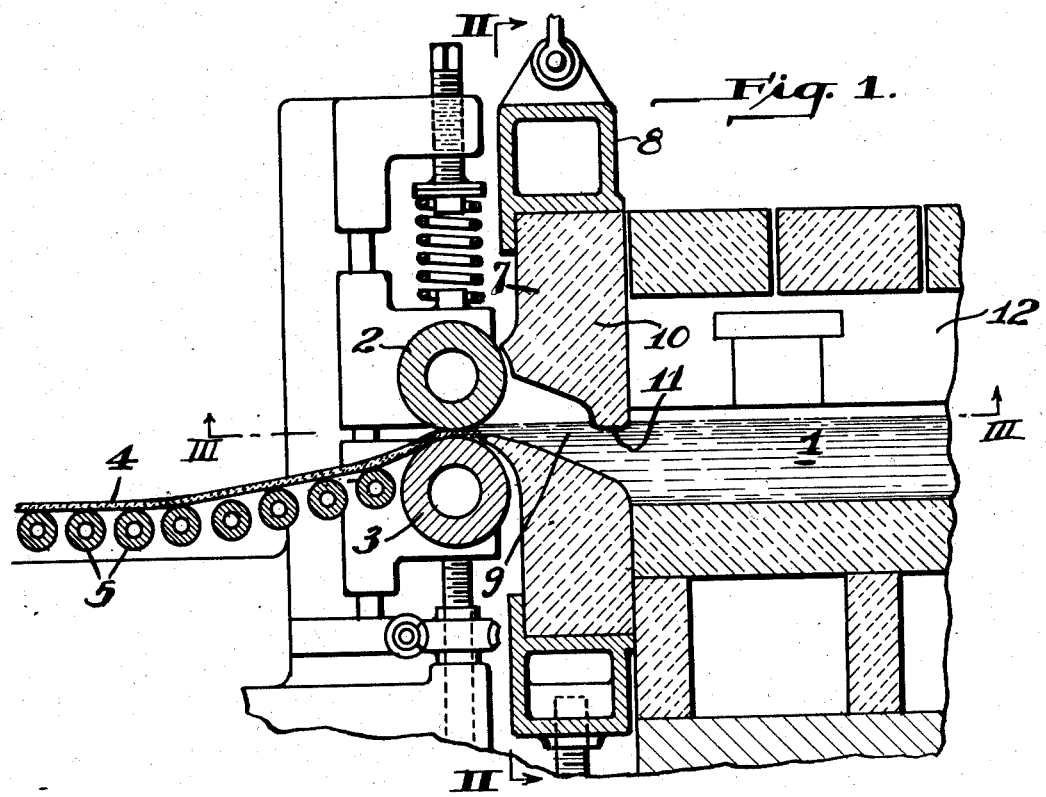
Figure 2:
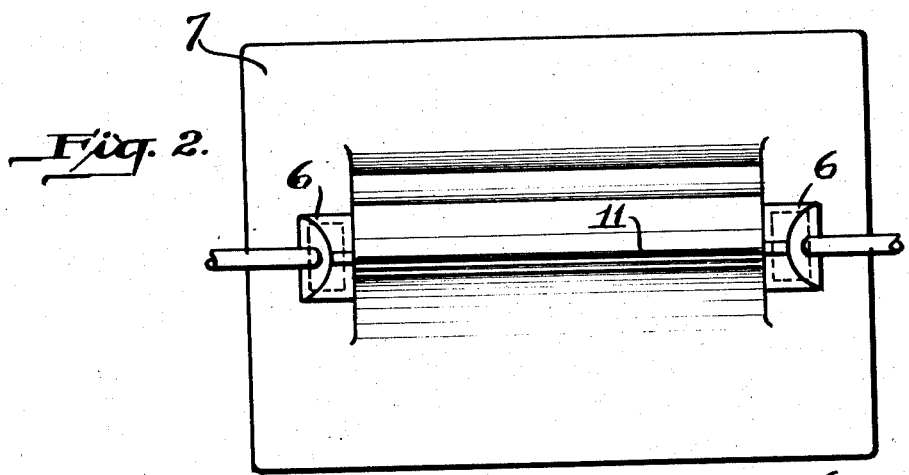

The invention relates to apparatus for rolling glass continuously from a tank and has for its objects the provision of an improved construction back of the forming rolls which will promote the speed of rolling and improve the quality by reducing the amount of ream and other defects in the sheet produced. Certain embodiments of the invention are illustrated in the accompanying drawing, wherein:

Figure 1 is a vertical section through one form of apparatus. Fig. 2 is a section on the line II—II of Fig. 1. And Fig. 3 is a section on the line III—III of Fig. 1.

Figure 3:
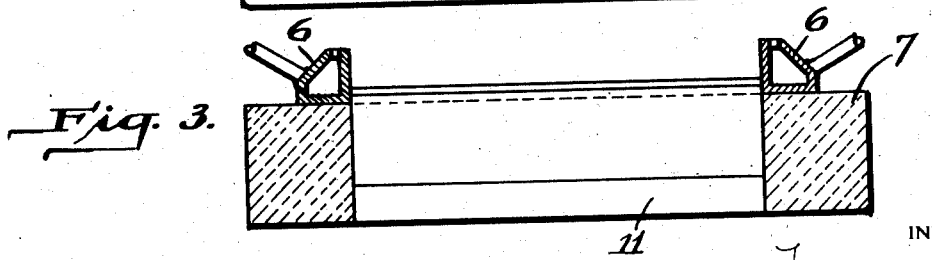

Referring to the construction of Figs. 1 to 3 as shown in the drawing, 1 is the end of a glass melting tank, preferably of the regenerative type; 2 and 3 are sheet-sizing or forming rolls suitably driven and water cooled; 4 is a continuous sheet of glass formed between the rolls, which sheet passes over the apron rolls 5 and through a roller leer (not shown); 6, 6 are the so-called "guns" located at the ends of the rolls and serving to define the width of the sheet 4; and 7 is the end wall of the tank suitably supported in a framework 8 whose vertical position may be adjusted by means of an overhead crane or other suitable device which is not shown.

The end wall 7 of the tank is provided with an outlet slot 9 by means of which the melted glass is conducted to the forming rolls 2, 3, such outlet having its upper wall 10 spaced above the glass for a substantial distance back from the rolls as shown in Fig. 1. At the rear end of the outlet slot is a depending lip 11 which projects down below the glass level and forms a seal which separates the space below the wall 10 from the space 12 lying above the surface of the body of glass in the melting tank. The use of the depending lip 11 involves substantial advantages over constructions heretofore used in which a construction of this kind was not employed. The use of this lip gives a seal between the body of glass forward of the lip and the main body of glass in the tank to the rear thereof, and as a result, the temperature of the glass just back of the rolls is considerably lower than would otherwise be the case. The glass is consequently stiffer and as a result the forming rolls may be run at a higher rate of speed, thus increasing the rate of sheet formation and improving the quality of the glass. This is due in part to the fact that the glass is carried away by the rolls as fast as it reaches them and there is no tendency to take away only a part of the glass and squeeze back the remainder as is the case with more fluid glass in which only a part of the glass is carried along by the rolls and the remainder is held back and eventually carried through the rolls at a much lower temperature than the main body of glass which forms the sheet. This latter condition produces ream which is one of the principal obstacles encountered in horizontal rolling in apparatus of the general type shown. The use of the lip is further advantageous in that it prevents a circulation of air over the glass just behind the rolls and admitted through the space between the upper roll 2 and the end wall 8. Without the lip, this circulation of air chills the glass flowing through the slot to form the sheet somewhat unevenly. Such unequal cooling also tends to produce ream. The general effect of the improvement, therefore, is to permit the rolling at an increased speed and to generally eliminate the formation of ream, which heretofore has been impossible to control. The vertical adjustment of the wall 8 permits the apparatus to be adjusted to meet variations in the glass level in the tank.

What I claim is:

1. The combination with a tank adapted to carry a bath of molten glass and having an outlet through one of its side walls with the upper wall of such outlet spaced above the level of the glass, of a pair of cooled metal sizing rolls in opposition of the outer end of said outlet, and a depending lip on said wall spaced back from the front face thereof and extending down into the glass so that an open pool of glass is provided between the lip and rolls with the space thereabove cut off from the area in the tank back of the lip.

2. The combination with a tank adapted to carry a bath of molten glass and having an outlet through one of its side walls with the upper wall of such outlet spaced above the level of the glass, of a pair of cooled metal sizing rolls in opposition to the outer end of said outlet, and a depending lip on said wall spaced back from the front face thereof and extending down into the glass so that an open pool of glass is provided between the lip and rolls with the space thereabove cut off from the area in the tank back of the lip, said wall being vertically adjustable.

FREDERICK GELSTHARP.